June 8, 1926.
T. VICARS
1,587,687
BISCUIT, BREAD, AND THE LIKE MACHINERY
Filed Dec. 12, 1923　　2 Sheets-Sheet 1
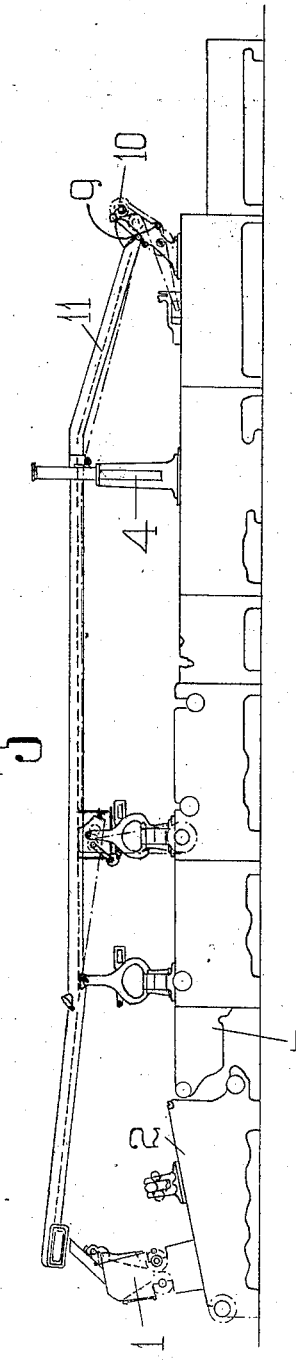
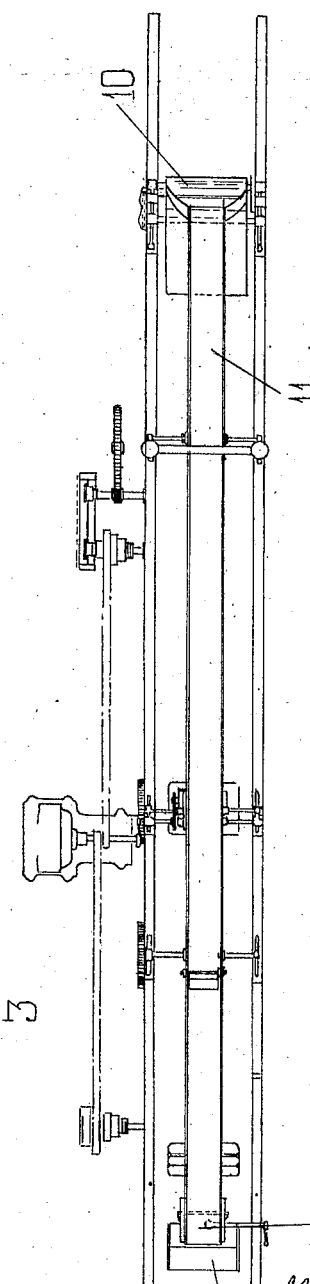

June 8, 1926.

T. VICARS 1,587,687

BISCUIT, BREAD, AND THE LIKE MACHINERY

Filed Dec. 12, 1923     2 Sheets-Sheet 2

Inventor.
Thomas Vicars
By Sturtevant + Mason
Attorneys

Patented June 8, 1926.

1,587,687

UNITED STATES PATENT OFFICE.

THOMAS VICARS, OF EARLESTOWN, ENGLAND.

BISCUIT, BREAD, AND THE LIKE MACHINERY.

Application filed December 12, 1923, Serial No. 680,211, and in England November 2, 1923.

The present invention relates to improvements in biscuit, bread and the like machinery operating upon dough, of the type in which measured quantities of dough are removed from a layer by means of stamps, cutters, or the like, whereupon the waste dough is passed back to the delivery hopper for reforming with fresh dough into the sheet from which the biscuits or other articles are taken by stamps, cutters or other device.

According to the present invention, the conveyor receiving the waste dough is driven at a higher rate of speed than the rate of delivery so that the waste dough to be returned to the hopper automatically becomes cut up into a number of small pieces facilitating its automatic distribution in the feed hopper.

The invention is more particularly described with reference to the accompanying drawings, in which:—

Figure 1 is a side elevation of a biscuit making machine taken by way of example.

Figure 2 is a corresponding plan view.

Figure 3:
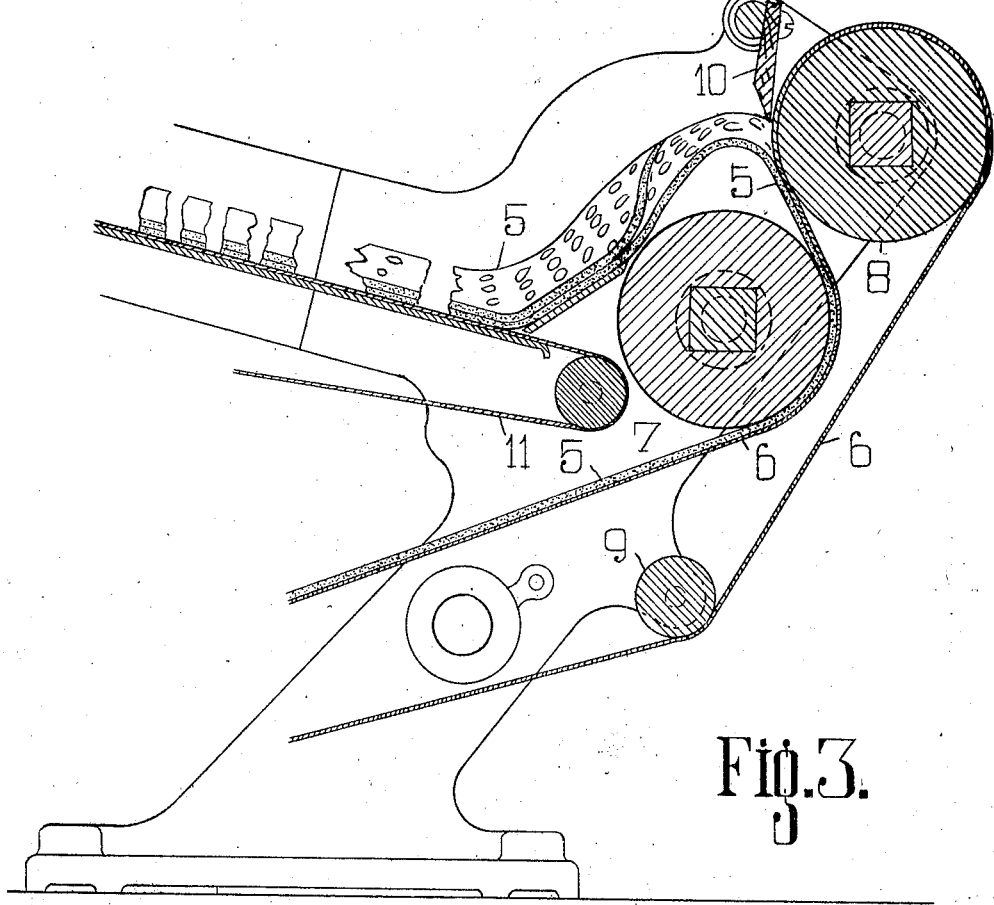
Figure 3 is a detailed view on a slightly enlarged scale of the return conveyor mechanism for the waste dough.
Figure 4:
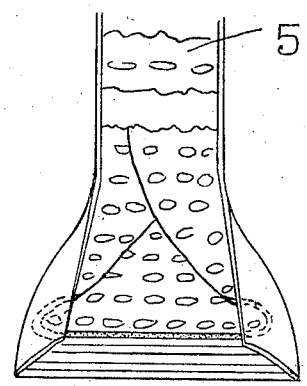
Fig. 4 is a sectional view of the dough sheet as it passes on to the delivery conveyor 11.

The dough is fed from a hopper 1 to a feed table 2 from which it passes as a continuous flat sheet to an operating bed 3 above which cutting devices 4 are arranged to stamp out from the continuous sheet of dough, biscuits or the like which thence pass on to trays or other supporting means for the baking process. Meanwhile the continuous sheet of dough from which the biscuits or the like measured quantities of dough have been stamped or removed passes still as a continuous but reticulated sheet 5 on to a conveyor belt 6 passing over rollers 7, 8 and 9, being stripped from the roller 8 by a knife or doctor 10 so that it falls at the speed of the conveyor 6 upon the delivery conveyor 11 which in the particular arrangement shown passes back above the main machine to feed the waste dough to a chute 12 passing this waste dough back into the hopper 1.

According to the present invention this conveyor 11 is fed at a greater rate of speed than the rate of the delivery conveyor 5 so that the dough becomes broken up into small portions and is fed in the form of small even distributed lumps into the hopper 1.

I declare that what I claim is:—

1. A machine for operating on sheet plastic material comprising means to remove measured quantities from said sheet, means to convey away the reticulated sheet so formed and a receiving conveyor moving at a greater speed than the speed of delivery to break up the said reticulated sheet into a plurality of separated pieces.

2. A biscuit making machine comprising means to spread dough as a thin sheet, means to convey said sheet in cutting devices, means to pass the reticulated sheet so formed away from the portions removed from it, a receiving conveyor, means for driving said conveyor at an increased speed over the speed of delivery of the reticulated sheet, and a hopper receiving dough from said receiving conveyor in the form of evenly distributed lumps.

3. A method of continuously working dough and like plastic material which consists in receiving and forming said material into a sheet, removing portions from said sheet to reticulate the same, same sheet being formed and reticulated while moving at a predetermined rate of speed, and returning said reticulated sheet to be reformed at a greater rate of speed than its speed of movement during forming and reticulating in order to break said sheet up into a plurality of small pieces for uniform distribution and mixture with newly received material.

In witness whereof, I have hereunto signed my name this 24th day of November 1923.

THOMAS VICARS.